(12) United States Patent
Petit

(10) Patent No.: US 12,454,859 B2
(45) Date of Patent: Oct. 28, 2025

(54) TWO-STAGE HERMETIC SEAL AND PROCESS OF MAKING SAME

(71) Applicant: V-GLASS, INC., Pewaukee, WI (US)

(72) Inventor: Peter Petit, Pewaukee, WI (US)

(73) Assignee: V-GLASS, INC., Pewaukee, WI (US)

( * ) Notice: Subject to any disclaimer, the term of this patent is extended or adjusted under 35 U.S.C. 154(b) by 267 days.

(21) Appl. No.: 18/001,166

(22) PCT Filed: Sep. 8, 2020

(86) PCT No.: PCT/US2020/049700
§ 371 (c)(1),
(2) Date: Dec. 8, 2022

(87) PCT Pub. No.: WO2021/252000
PCT Pub. Date: Dec. 16, 2021

(65) Prior Publication Data
US 2023/0212905 A1    Jul. 6, 2023

Related U.S. Application Data

(60) Provisional application No. 63/038,102, filed on Jun. 11, 2020.

(51) Int. Cl.
*E06B 3/66* (2006.01)
*C03C 27/08* (2006.01)
(Continued)

(52) U.S. Cl.
CPC ............ *E06B 3/6612* (2013.01); *C03C 27/08* (2013.01); *C03C 27/10* (2013.01); *E06B 3/6617* (2013.01);
(Continued)

(58) Field of Classification Search
CPC ... E06B 3/6612; E06B 3/66342–66357; E06B 3/67334; E06B 3/677;
(Continued)

(56) References Cited

U.S. PATENT DOCUMENTS 2,707,850 A    5/1955  Dalton et al.
3,249,466 A    5/1966  Lusher
(Continued)

FOREIGN PATENT DOCUMENTS

CN    106460446 A        2/2017
DE    102009040422 A1 *  3/2011  ............ E06B 3/677
(Continued)

OTHER PUBLICATIONS

Machine translation of DE 102009040422.*
(Continued)

*Primary Examiner* — Z. Jim Yang
(74) *Attorney, Agent, or Firm* — Michael Best & Friedrich LLP

(57) ABSTRACT

An evacuated glazing assembly has first and second spaced-apart, non-metal substrates connected to each other by a seal element to form an evacuable interior space therebetween. The seal element is formed by bonding a metallic bridge element to at least one of the substrates by cold welding to form a first stage seal and forming a second stage seal at least partially in contact with the first stage seal. The seal element is configured to hermetically isolate the interior space from the surrounding environment, and both the first stage seal and the second stage seal contribute to the hermeticity of the seal element.

22 Claims, 5 Drawing Sheets

(51) Int. Cl.
*C03C 27/10* (2006.01)
*E06B 3/663* (2006.01)
*E06B 3/673* (2006.01)

(52) U.S. Cl.
CPC ...... *E06B 3/66304* (2013.01); *E06B 3/66357* (2013.01); *E06B 3/67334* (2013.01)

(58) Field of Classification Search
CPC ..... E06B 3/6775; Y02A 30/249; Y02B 80/22; C03C 27/02–10
See application file for complete search history.

(56) References Cited

U.S. PATENT DOCUMENTS

| | | | |
|---|---|---|---|
| 3,608,265 | A | 9/1971 | Meunier |
| 4,994,309 | A * | 2/1991 | Reichert ............ E06B 3/66357 52/204.593 |
| 5,005,577 | A | 4/1991 | Frenkel |
| 5,009,218 | A | 4/1991 | Bachli |
| 5,641,713 | A | 6/1997 | Kyle |
| 5,657,607 | A | 8/1997 | Collins et al. |
| 7,081,178 | B2 | 7/2006 | Collins |
| 7,722,956 | B2 | 5/2010 | Collins |
| 7,919,157 | B2 | 4/2011 | Cooper |
| 7,926,695 | B2 | 4/2011 | Hagen et al. |
| 8,181,844 | B2 | 5/2012 | Hagen et al. |
| 8,329,267 | B2 | 12/2012 | Bettger et al. |
| 8,512,829 | B2 | 8/2013 | Cooper |
| 8,944,308 | B2 | 2/2015 | Friedl et al. |
| 8,944,398 | B1 | 2/2015 | Miller |
| 8,950,162 | B2 | 2/2015 | Miller et al. |
| 9,546,513 | B2 | 1/2017 | Stark et al. |
| 2008/0166570 | A1 * | 7/2008 | Cooper ................ E06B 3/6612 428/426 |
| 2008/0245011 | A1 * | 10/2008 | Friedl ................ E06B 3/66342 52/745.19 |
| 2011/0296797 | A1 * | 12/2011 | Stark .................... E06B 3/6612 52/788.1 |
| 2012/0131882 | A1 | 5/2012 | Sporn et al. |
| 2012/0321821 | A1 * | 12/2012 | Li ........................ C03C 27/08 228/110.1 |
| 2013/0101759 | A1 * | 4/2013 | Jones ................... E06B 3/6612 428/34 |
| 2013/0140347 | A1 | 6/2013 | Friedl et al. |
| 2013/0206230 | A1 | 8/2013 | Sridharan et al. |
| 2014/0050867 | A1 * | 2/2014 | Zhao ................... E06B 3/67334 428/34 |
| 2014/0220268 | A1 | 8/2014 | Dreux |
| 2015/0030789 | A1 * | 1/2015 | Matsumoto ............. C03C 3/068 428/34 |
| 2015/0218877 | A1 * | 8/2015 | Kawahara ................ B32B 7/05 428/34 |
| 2015/0345208 | A1 * | 12/2015 | Boulanger ............ E06B 3/6612 428/34 |
| 2016/0108659 | A1 * | 4/2016 | Stark ......................... B32B 7/14 52/786.1 |
| 2016/0138324 | A1 | 5/2016 | Lameris et al. |
| 2017/0107753 | A1 * | 4/2017 | Koga ..................... E06B 3/66 |
| 2017/0191304 | A1 * | 7/2017 | Petit ..................... E06B 3/6612 |
| 2017/0283318 | A1 * | 10/2017 | Yokota ................... B23K 35/30 |
| 2018/0044971 | A1 | 2/2018 | Veerasamy et al. |
| 2018/0066470 | A1 * | 3/2018 | Dai ....................... C03C 27/10 |
| 2019/0024442 | A1 * | 1/2019 | Chorine ................. E06B 3/025 |
| 2019/0162011 | A1 * | 5/2019 | Yang ..................... E06B 3/663 |
| 2020/0325723 | A1 * | 10/2020 | Caliaro ............... E06B 3/67334 |
| 2022/0081958 | A1 * | 3/2022 | Özden ..................... E06B 3/56 |

FOREIGN PATENT DOCUMENTS

| | | | | |
|---|---|---|---|---|
| DE | 102014005140 A1 * | 10/2015 | ............ | H10F 77/68 |
| EP | 2248985 A1 | 11/2010 | | |
| EP | 2176185 B1 | 3/2016 | | |
| EP | 1978199 B1 | 5/2016 | | |
| JP | 2013514245 A | 4/2013 | | |
| JP | 2013527101 A | 6/2013 | | |
| JP | 2014162701 A | 9/2014 | | |
| JP | 2017512171 A | 5/2017 | | |
| WO | 2012/170566 A1 | 12/2012 | | |
| WO | 2020/011328 A1 | 1/2020 | | |

OTHER PUBLICATIONS

Machine translation of DE 102014/005140 A1.*
International Search Report for corresponding International Application No. PCT/US2020/049700, mailed Feb. 4, 2021.

* cited by examiner

TWO-STAGE HERMETIC SEAL AND PROCESS OF MAKING SAME

CROSS-REFERENCE TO RELATED APPLICATIONS

The present application is a national phase application filing of International Patent Application No. PCT/US20/49700, filed Sep. 8, 2020, which claims priority to U.S. Provisional Patent Application No. 63/038,102, filed Jun. 11, 2020, the entire contents of each of which is incorporated herein by reference.

STATEMENT REGARDING FEDERALLY-SPONSORED RESEARCH OR DEVELOPMENT

This invention was made with government support under SBIR Assistance Agreement DE-SC0017841 awarded by the United States Department of Energy. The government has certain rights in the invention.

FIELD OF THE INVENTION

The present invention relates to a process for creating a two-stage hermetic seal element for an envelope having an interior region that is isolated from the environment.

BACKGROUND

Many existing evacuated glazing assemblies (e.g., vacuum-insulated glass ("VIG") assemblies) include two or more panes (e.g., glass panes) that are separated from each other by a space. A temperature differential across the assembly can significantly impact the structure of the assembly and, in some cases, cause the assembly to fail. For example, when an evacuated glazing assembly is installed in an exterior wall of a temperature-controlled and/or insulated building, the temperature of the exterior pane typically approaches the outside air temperature (contracting when exposed to cold, expanding when exposed to heat). The interior pane typically remains at a relatively constant temperature that is consistent with the inside air temperature. Movement of the exterior pane (i.e. contraction or expansion) relative to the interior pane is known as "differential pane movement," and too much differential pane movement may result in failure of the evacuated glazing assembly due to cracking, seal failure, or other mechanisms.

SUMMARY

One type of hermetic seal element that may be used to seal between panes of an evacuated glazing assembly includes a metallic bridge element (e.g., a metal foil) that is welded to a metallic adhesive layer deposited on the panes. Examples of such a hermetic seal element are provided in U.S. Provisional Application No. 62/936,140, filed Nov. 15, 2019, the entire content of which is incorporated herein by reference.

Hermetic seal elements may fail (that is, leak) via a variety of different mechanisms, including microleakage paths along the interface between the metallic bridge element and the glass, flaws in the metallic bridge element (e.g., scratches, wrinkles, microstructure damage, perforation through or along the edges of welds, joints between discrete segments comprising a metallic bridge element, etc.), flaws in the glass (e.g., scratches), flaws due to uncontrolled process parameter variations (e.g., due to "tramp" metal adhered to the sonotrode), and misalignment of weld segments where they overlap. While these failure mechanisms may be minimized using tightly-controlled manufacturing processes, a need exists for a seal configuration that can provide more reliable hermeticity in a cost-efficient manner.

The invention provides, in one aspect, an evacuated glazing assembly having first and second spaced-apart substrates connected to each other by a seal element to form an evacuable interior space therebetween. The seal element is formed by bonding a metallic bridge element to at least one of the substrates by cold welding to form a first stage seal and forming a second stage seal at least partially in contact with the first stage seal. The seal element is hermetic in that the seal element is configured to effectively isolate the interior space from the surrounding environment.

The invention provides, in another aspect, an evacuated glazing assembly including a first substrate, a second substrate spaced from the first substrate to define an interior space therebetween, and a seal element disposed between the first substrate and the second substrate to hermetically isolate the interior space from a surrounding environment. The seal element includes a first stage seal formed by a cold-welded bond between the metallic bridge element bonded and the first substrate, and a second stage seal at least partially in contact with the first stage seal.

The invention provides, in another aspect, a method of forming a sealing element for hermetically sealing between two substrates of an evacuated glazing assembly. The method includes bonding a metallic bridge element to each of the two substrates to form a first hermetic sealing stage, applying a sealing material at least partially contacting the first sealing stage, and heating the sealing material to form a second hermetic sealing stage.

Other features and aspects of the invention will become apparent in view of the following description and drawings.

Figure 1:
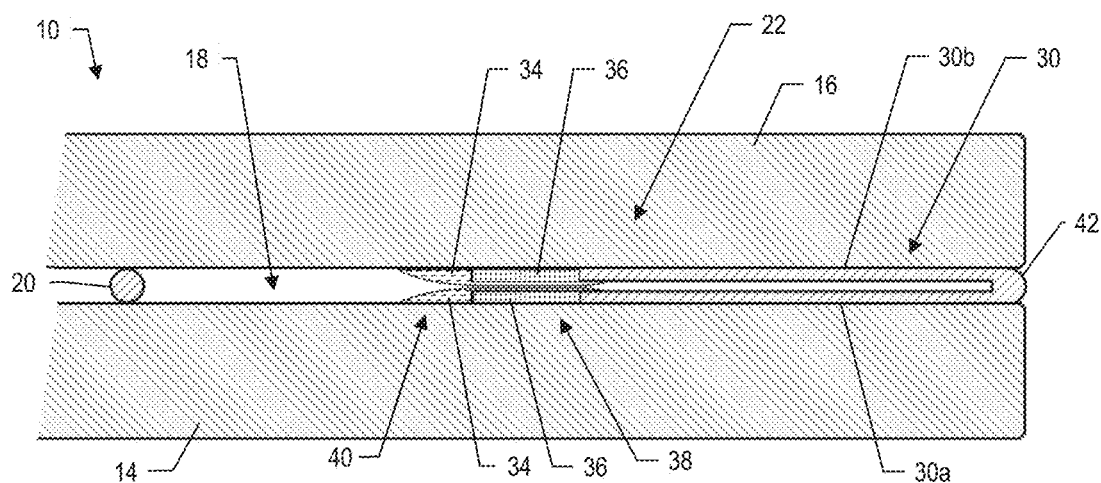
FIG. 1 is a partial section view of an exemplary evacuated glazing assembly including an interior space and a seal element that isolates the interior space from a surrounding environment.

Before any embodiments of the invention are explained in detail, it is to be understood that the invention is not limited in its application to the details of construction and the arrangement of components set forth in the following description or illustrated in the above-described drawings. The invention is capable of other embodiments and of being practiced or of being carried out in various ways without significantly departing from the spirit of the invention.

Definitions

As used herein, the term "pane" refers to a glass element intended for use as a wall element or substrate in a flat hermetically-sealed enclosure assembly.

"Differential pane movement" refers to the relative pane movement between two adjacent panes that occurs when the temperature of one pane changes relative to the temperature of the other pane. It may also refer to the relative pane movement that occurs under mechanical influence or other influence (e.g., impact during handling or use).

"Hermeticity" or "level of hermeticity" refers to a measure of the maximum leakage rate of which a seal is capable, measured for example in terms of standard cubic centimeters of helium/second per centimeter of seal length ("sccs/cm"), or equivalent. In general, higher hermeticity corresponds to a lower value of leakage rate, and vice versa.

"Hermetic" refers to a seal that is capable of achieving the hermeticity appropriate or specified for the application. It should be recognized that each stage in a multi-stage seal, such as seal stages described and illustrated herein, may be described as hermetic without inferring that the hermeticity for each stage is the same.

The term "highly-malleable" refers to an object or material having a yield stress no greater than 10,000 psi (e.g., no greater than 5,500 psi).

The phrase "solid-state" with respect to welding or coating means a joining process that does not involve melting of the materials being joined.

The term "cold weld" refers to a solid-state process for joining two or more parts.

The term "sonotrode" refers to a vibrating tool that transmits translational motion to the assembly of substrates to be welded by an ultrasonic bonding device.

The terms "mechtrode" or "mechatrode" refers to a mandrel or other end-effector tool used in processes, typically not involving ultrasonic vibration, for solid-state joining or coating of materials by virtue of relative motion under pressure.

The term "inboard," with respect to a location of a first feature relative to a second feature on an assembly having a generally planar shape, refers to a location of the first feature on the side of the second feature that is closer to the centroid of the generally planar shape.

The term "outboard," with respect to a location of a first feature relative to a second feature on an assembly having a generally planar shape, refers to a location of the first feature on the side of the second feature that is farther from the centroid of the generally planar shape.

The term "bridge element" means an element that is bonded to a substrate, and that forms a portion of a hermetic seal element isolating an interior space from the environment.

DETAILED DESCRIPTION

FIG. 1 illustrates a portion of an exemplary evacuated glazing assembly 10 (e.g., a window assembly configured for installation into an exterior wall of a building) that includes a first substrate 14 (e.g., a first pane) and a second substrate 16 (e.g., a second pane) spaced from the first substrate 14 to define an interior space 18 (also referred to as an evacuable gap or interior region) to be sealed and isolated from an environment surrounding the evacuated glazing assembly 10. One or more spacers 20 formed from an incompressible or substantially incompressible material (e.g., composite, plastic, glass, metal, etc.) may be positioned in the interior space 18 between the substrates 14, 16 to maintain a consistent gap between the substrates 14, 16. The substrates 14, 16 in the illustrated embodiment are non-metal (e.g., glass, such as annealed or tempered glass). In other embodiments, one or both substrates 14, 16 may be metallic. A seal element 22 is attached to each of the substrates 14, 16 to seal the interior space 18 from the surrounding environment.

With continued reference to FIG. 1, the seal element 22 includes a metallic bridge element 30 and a sealing material 34. The bridge element 30 can be formed of one or more layers of metal foil (e.g., aluminum foil). In the illustrated embodiment, the bridge element 30 is formed from two segments 30a, 30b, each attached directly to a respective substrate 14, 16 via a solid-state weld process (e.g., a friction welding process using a sonotrode) to form a weld 36. In the illustrated embodiment, the two segments 30a, 30b are connected to each other by a connecting weld 42 (e.g., a fusion weld, such as a laser weld, MicroTIG weld, resistance weld, etc., or the weld 42 may include a solid-state weld). In other embodiments, the segments 30a, 30b of the bridge element 30 may be integrally formed from a single piece of material, or the segments 30a, 30b may be connected together in other ways.

Figure 2:
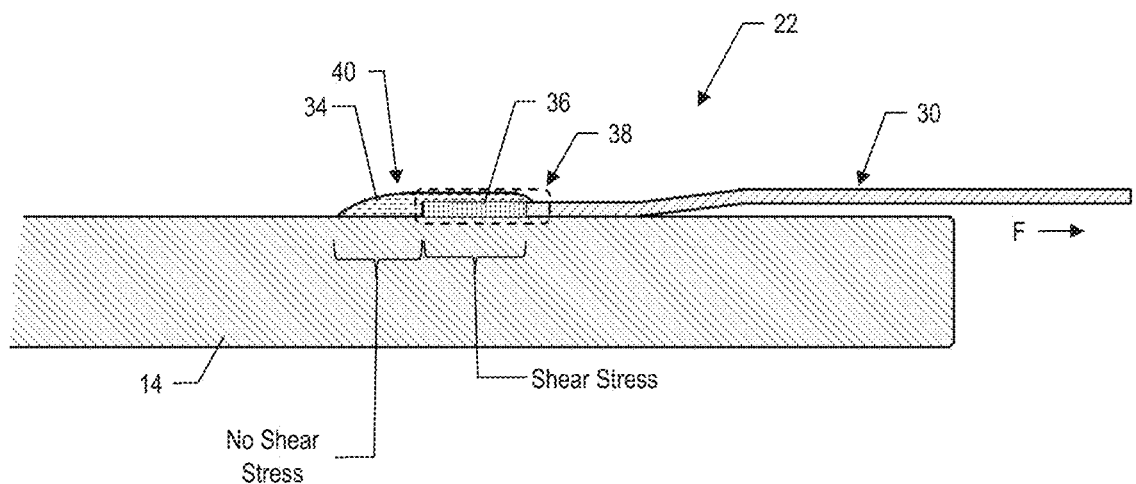
FIG. 2 is a partial section view illustrating a first stage and a second stage of the seal element of FIG. 1 coupled to a substrate.

Referring to FIG. 2, the bridge element 30 is attached to the substrate 14 by the weld 36. The bridge element 30 extends across the interior space 18 along its perimeter boundary (i.e. between the substrates 14, 16), to hermetically seal the interior space 18. The weld 36 defines a first sealing stage 38 (which may also be referred to as a first stage seal or primary seal) of the seal element 22. The first stage seal 38 is hermetic and also provides a structural connection between the bridge element 30 and the substrate 14. That is, the first stage seal 38 is configured to resist shearing forces due to thermal expansion or differential pane movement. In some embodiments, the structural connection between the bridge element 30 and the substrate 14 defined by the first stage seal 38 has a greater shear strength than the tensile strength of the bridge element 30 itself.

Figure 3:
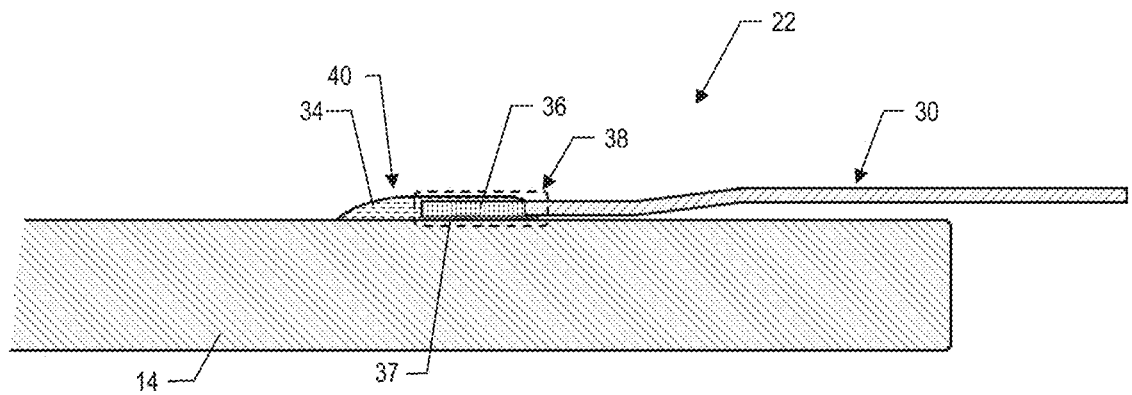
FIG. 3 is a partial section view illustrating a first stage and a second stage of a seal element according to another embodiment.

With reference to FIG. 3, in some embodiments, the seal element 22 further includes an interlayer 37, which may be made of a metal (e.g., aluminum) or inorganic material. In particular, the interlayer 37 is formed as a coating that is deposited or otherwise placed on the edge portions (e.g., around a periphery) of the substrate 14. For example, in some embodiments, the interlayer 37 may be deposited on the substrate 14 using a mechatrode. The bridge element 30 is attached to the substrate 14 over the interlayer 37 to form the weld 36 (e.g., by a solid-state weld process such as a friction welding process using a sonotrode) and thereby form the first stage seal 38. The interlayer 37 may improve the mechanical strength and/or hermeticity of the first stage seal 38.

With reference to FIGS. 2-3, the sealing material 34 is at least partially in contact with the first stage seal 38 and defines a second sealing stage 40 (which may also be referred to as a second stage seal or secondary seal) of the seal element 22. The sealing material 34 may be comprised of solderglass, metal solder, or other material suitable for bonding to the bridge element 30 and/or the substrate 14 and forming a seal of the required hermeticity. Typically, the hermeticity of a flaw-containing first sealing stage 38 is less (that is, leaks more) than that for the corresponding second sealing stage 40. In contrast, the hermeticity of a first sealing stage 38 that is flaw-free is typically similar to that for the corresponding second sealing stage 40. Correspondingly, the hermeticity of the combined two-stage seal element 22 is on the same order as the hermeticity of the second stage seal 40.

In some embodiments, the sealing material 34 may be an organic sealing material. In such embodiments, the organic sealing material is preferably a low-outgassing and low-permeation rate organic sealing material. Organic sealing materials have not previously been able to provide long-lasting hermetic sealing performance in a passive (i.e. not actively pumped) evacuated glazing assembly. The two-stage seal element 22 may allow use of organic sealing material for the second sealing stage 40, however, because the hermetic first stage seal 38 minimizes the exposure of the second stage seal 40 to the outside environment. In other words, the first stage seal 38 reduces potential gas permeation through the second stage seal 40, which allows for a greater variety of materials to be used for the second stage seal 40 without compromising the overall hermiticity of the seal element 22.

In the illustrated embodiment, the sealing material 34 covers the entire first stage seal 38. In other embodiments, the sealing material 34 may be applied to contact only a portion of the first stage seal 38 (e.g., the second stage seal 40 may abut the inboard edge of the first stage seal 38, covering the interface joint between first stage seal 38 and the substrate 14). The sealing material 34 can be bonded to one or both the substrate 14 and the bridge element 30.

The sealing material 34 has a melting and/or curing temperature lower than a melting temperature of the substrates 14, 16 and other portions of the evacuated glazing assembly 10. In some embodiments, the sealing material 34 is melted and/or cured to form a bond with the substrate 14 and the bridge element 30 by heating at least a portion of the product 10 containing the sealing material 34 using a heating device. In some embodiments, the entire assembly 10 can be heated using a heating device (e.g., an oven) to melt and/or cure the sealing material 34 and thereby form the second stage seal 40.

Referring to FIG. 2, because the first stage seal 38 is positioned outboard of the second stage seal 40, the structural connection formed by the weld 36 between the bridge element 30 and the substrate(s) 14, 16 bears substantially all of the shear stress that may be applied to the seal element 22. That is, if a force F is applied to the seal element 22 (e.g., due to unequal thermal expansion and/or differential pane movement), substantially all of the shear stress will be borne by the high strength weld 36 of the first stage seal 38 and not by the second stage seal 40. Because the second stage seal 40 is shielded from mechanical stress by the first stage seal 38, hermeticity of the second stage seal 40 may be preserved for a longer period. In other embodiments, however, the second stage seal 40 may be positioned at least partially on an outboard side of the first stage seal 38.

Figure 4:
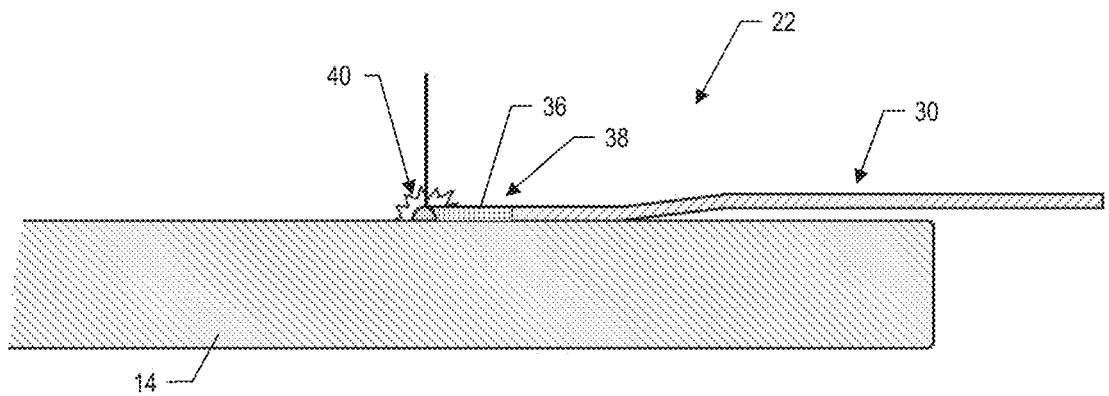
FIG. 4 is a partial section view illustrating a first stage and a second stage of a seal element according to another embodiment.
Figure 5:
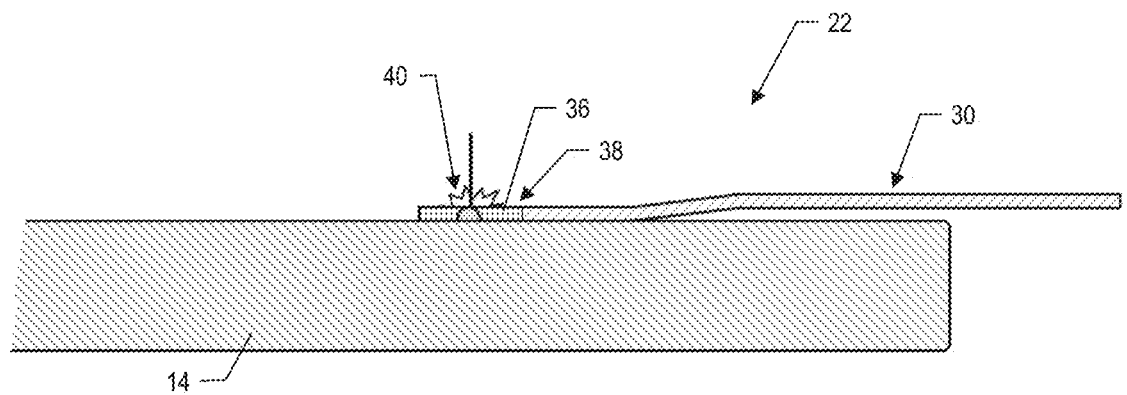
FIG. 5 is a partial section view illustrating a first stage and a second stage of a seal element according to another embodiment.
Figure 6:
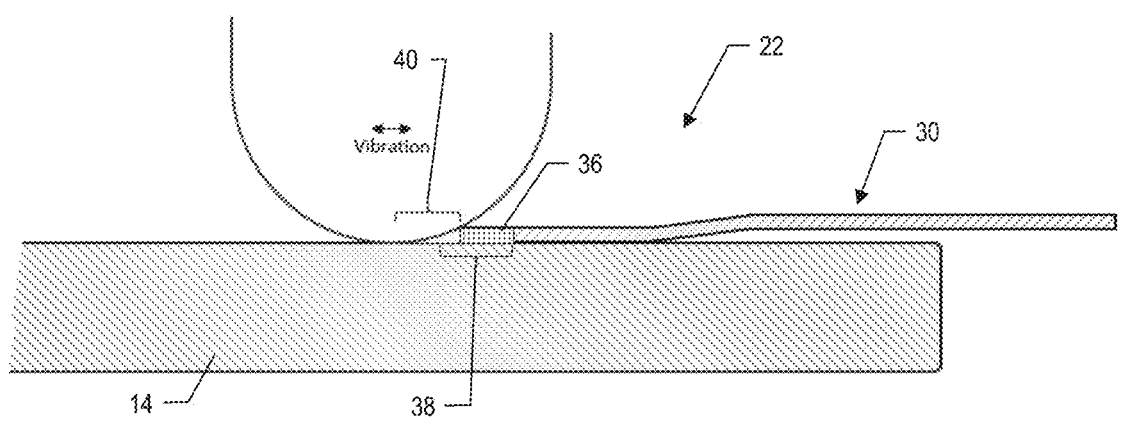
FIG. 6 is a partial section view illustrating a first stage and a second stage of a seal element according to another embodiment.

FIGS. 4-6 illustrate various constructions of the second stage seal 40. For example, the second stage seal 40 may be formed by melting an inboard edge of the bridge element 30 (FIG. 4) and/or an intermediate portion of the bridge element 30 within the area of the first stage seal 38 (FIG. 5). In such embodiments, the second stage seal 40 may be formed by laser welding. Referring to FIG. 6, the second stage seal 40 may be formed by cold-welding an inboard edge of the bridge element 30 and/or an intermediate portion of the bridge element 30 within the area of the first stage seal. The embodiments of the second stage seal 40 illustrated in FIGS. 4-6 permit the second stage seal 40 to be formed either before or after the first stage seal 38, providing additional flexibility in the manufacturing process.

Figure 7:
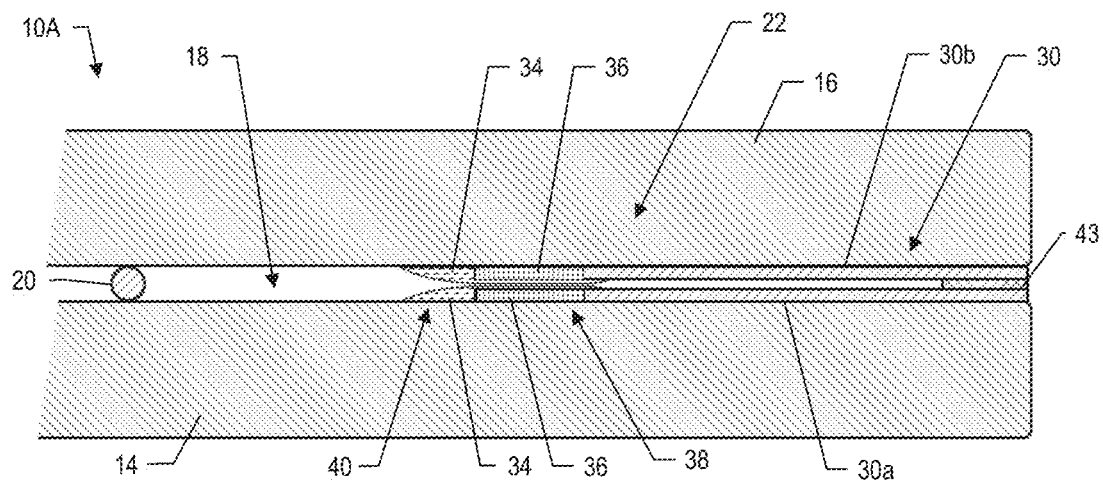
FIG. 7 is a partial section view of the evacuated glazing assembly of FIG. 1 including a seal element according to another embodiment.

Although only the substrate 14 is illustrated in FIGS. 2-6, the seal element 22 includes substantially identical first and second sealing stages at the interface between the bridge element 30 and the second substrate 16 (FIG. 1). Referring back to FIG. 1, the connecting weld 42 can be applied to the outer extents of the bridge element 30 to bond the segments 30a, 30b of the bridge element 30 together. With reference to FIG. 7, in another embodiment of a similar evacuated glazing assembly 10A, the connecting weld 42 may be replaced by connecting material 43 joining the segments 30a, 30b of the bridge element 30. The connecting material 43 may be a metallic solder or a solderglass material, for example. Using connecting material 43 in place of the connecting weld 42 may provide a lower heat input into the seal element 22 and the substrate(s) 14, 16 during application. In yet other embodiments, the connecting material 43 may be an adhesive.

Figure 8:
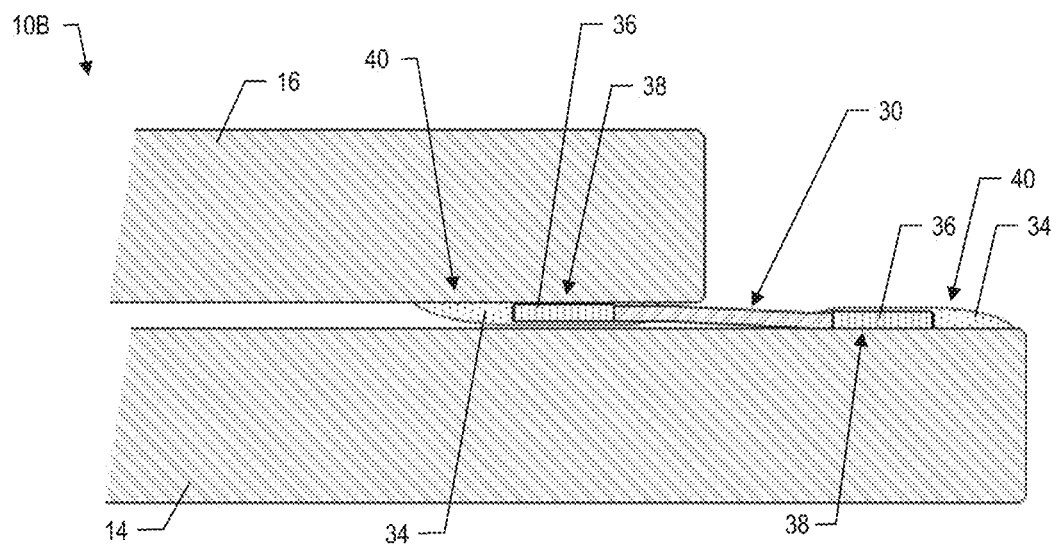
FIG. 8 is a partial section view of the evacuated glazing assembly of FIG. 1 including a seal element according to another embodiment.

Referring to FIG. 8, in another embodiment of a similar evacuated glazing assembly 10B, the bridge element 30 is formed from a single, generally planar segment. As such, the connecting weld 42 and the connecting material 43 illustrated in the embodiments of FIGS. 1 and 7, respectively, may be omitted. In the illustrated embodiment, the peripheral edges of the substrates 14, 16 are offset, such that an outboard edge of the first substrate 14 is spaced apart from an outboard edge of the second substrate 16. The offset arrangement provides access for forming the outboard sealing stages 38, 40.

Figure 11:
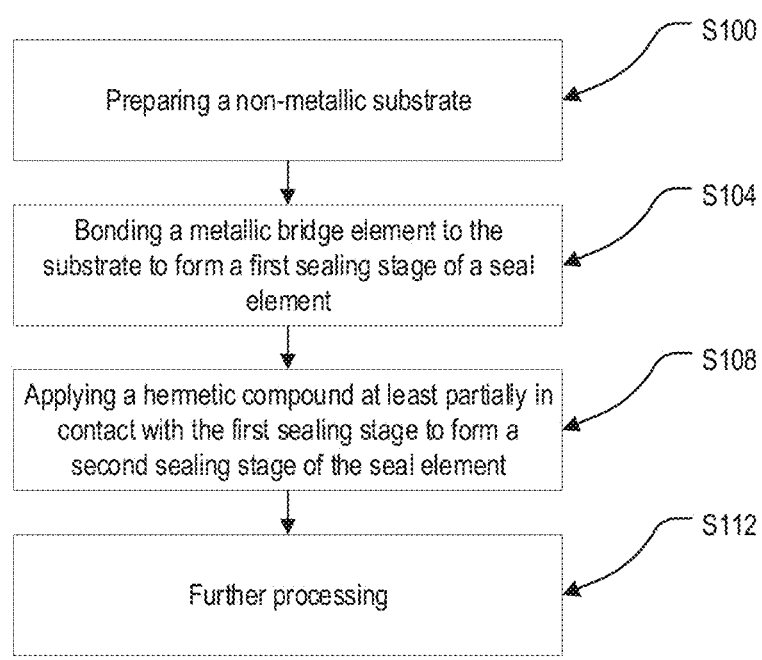
FIG. 11 is a flow chart illustrating a sealing process according to an embodiment of the disclosure.

FIG. 11 illustrates an exemplary process with four primary steps for producing a two-stage seal element, such as the embodiments of the seal element 22 described above with reference to FIGS. 1-8, and for placing and attaching the seal element 22 relative to the substrate(s) 14, 16. It will be appreciated that FIG. 11 encompasses the general process, and that additional steps may be incorporated into the process to facilitate formation of the seal element 22, as well as placement and attachment of the seal element 22 on the substrate(s) 14, 16. The general process includes i) preparing a non-metallic substrate (step S100), ii) attaching the metallic bridge element to the substrate to form the first sealing stage (step S104), iii) applying a sealing material at least partially in contact with the first sealing stage to form a second sealing stage (step S108) and, iv) further processing (step S112). These primary steps may be performed in sequence, or one or more steps may be performed simultaneously.

In the first primary step (step S100), the substrate 14, 16 is prepared, which may include cleaning the substrate 14, 16 (e.g., by plasma cleaning in some embodiments) and/or applying an interlayer (e.g., interlayer 37; FIG. 3) to the substrate 14, 16. In some embodiments, the interlayer 37 is applied to the substrate 14, 16 using a process or method that does not include an oven for heating the substrate 14, 16, and that does not use a vacuum chamber (i.e. an oven-free, vacuum chamber-free process). For example, in some embodiments, a malleable metal (e.g., aluminum) is applied to the non-metal substrate using friction surfacing. Friction surfacing includes pressing a metal consumable (e.g., a "mechatrode") that is formed of the malleable metal onto the surface of the non-metallic substrate and moving one or both of the metal consumable and the substrate (i.e. to achieve relative movement) to deposit or transfer the malleable metal onto the surface, which forms the metallic layer that is part of the seal element. In some constructions, a stable gas (e.g., argon) can be used to exclude oxygen during the friction surfacing process.

In the second primary step (step S104), the metal bridge element 30 is attached to the substrate 14, 16, either directly or to the optional interlayer 37, by a cold welding process. In particular, a sonotrode of an ultrasonic seam welder can be used to weld the metal bridge element 30 and form the weld 36 that defines the first sealing stage 38.

In the third primary step (step S108), the sealing material 34 is applied at least partially in contact with the first sealing stage 38. In some embodiments, the sealing material 34 is provided as a powder (e.g., powdered solderglass), which is distributed over first sealing stage 38. In some embodiments, the sealing material 34 can be provided as a gel or the like. In yet other embodiments (e.g., FIGS. 4-6), the sealing material 34 can be a portion of the metal bridge element 30 itself, melted or otherwise transformed by a laser-welding, cold-welding, or other similar process to form the second sealing stage 40.

Finally, in the fifth primary step (step S112), further processing may occur, such as melting and/or curing the sealing material 34 (e.g., using an oven or other heat source) to form the second sealing stage 40. Additional processing may include subjecting the interior space 18 to a vacuum. The further processing of the assembly can take many forms, including igniting getter in the interior space and, in some cases, secondary welding or sealing steps that may be needed to ensure the interior space can be evacuated or permanently sealed.

Figure 9:
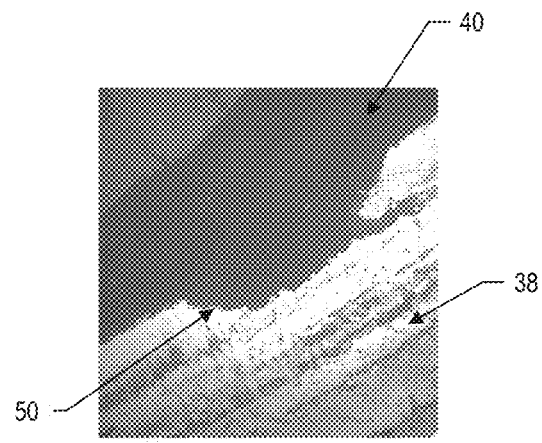
FIG. 9 is a photograph illustrating a first stage and a second stage of a seal element embodying aspects of the present disclosure.

A two-stage seal element 22 according to embodiments described and illustrated herein provides numerous advantages over a single-stage seal element. For example, the second stage seal 40 provides a redundant or second hermetic seal that may maintain the integrity of the seal element 22 should the hermeticity of first stage seal 38 be degraded via any of a variety of different mechanisms, including microleakage, perforation through or along the edges of welds, flaws in the metallic bridge element 30 (e.g., scratches, wrinkles, etc.), flaws in the substrate(s) 14, 16 (e.g., scratches), and misalignment. As such, the first stage seal 38 may be made in a less costly manner (e.g., with lower manufacturing tolerances, fewer quality control tests, etc.) while contributing to effective overall hermetic sealing performance. In some embodiments, the two-stage seal element 22 may also provide the sealed product with a longer useful life. As illustrated in FIG. 9, it should be appreciated that the second stage seal 40 also may repair (that is, eliminate leakage due to) flaws 50 that may exist in the first stage seal 38 (e.g., by filling voids and microleaks, etc.).

Because the second stage seal 40 may be at least partially inboard of the first stage seal 38 in some embodiments, gases that may become trapped therebetween or at the interface of the bridge element 30 and the substrate(s) 14, 16 cannot communicate with the interior space 18 to be evacuated. This can advantageously result in faster pump-down of the interior space 18. In addition, when solderglass is used as the sealing material 34, the second stage seal 40 can dissolve an adjacent portion of certain commonly-used coatings on the substrate(s) 14, 16 (such as a low-emissivity coating), providing a barrier against progression of corrosion that may take place along the coating and thereby protecting the evacuated interior space 18.

A significant advantage of the two-stage seal element 22 according to embodiments described and illustrated herein is that the metal bridge element 30 is in both physical and bonded contact with the non-metal substrate. This provides improved sealing performance.

In some embodiments, the two-stage seal element 22 may provide a convenient chamber to accommodate a getter ribbon or getter particles, which remove residual gases from the evacuated interior space. Such a chamber may inhibit the getter material from migrating into a visible area of the product after the getter has reacted.

In some embodiments (e.g., FIG. 1), the second stage seal 40 may maintain a gap between opposing portions of the metallic bridge element 30, thereby inhibiting heat transfer between the two substrates 14, 16 that may occur due to conduction through the metallic bridge element 30.

Figure 10:
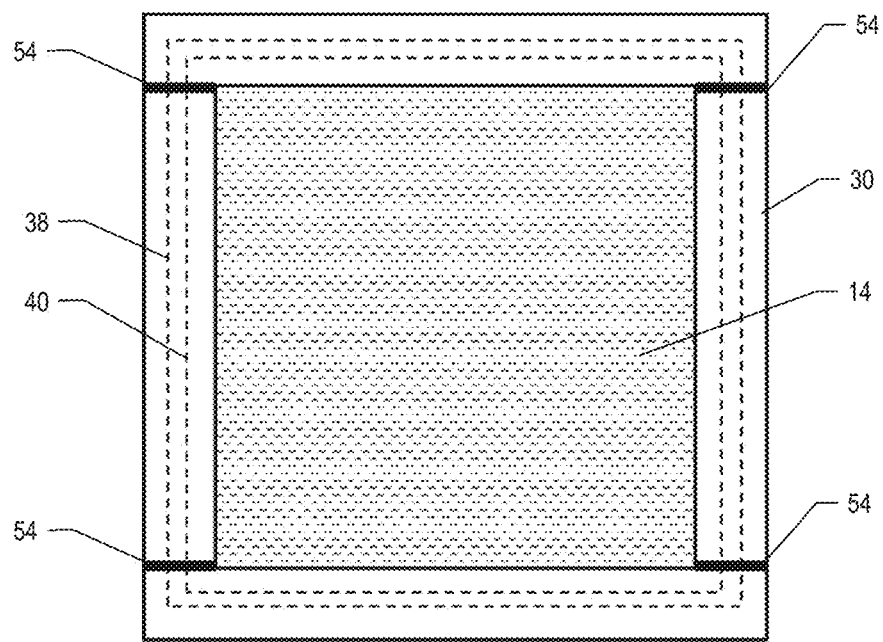
FIG. 10 is a top view illustrating ribbons of foil coupled to a substrate.

In some embodiments, the two-stage seal element 22 advantageously allows the metallic bridge element 30 to be formed using foil ribbon segments (as shown in FIG. 10), rather than using full face foil, which would be subsequently trimmed inboard of the seal element 22. Because foil ribbon is connected at corners or other transitions using welded joints 54, the first stage seal 38 may be more likely to experience a defect causing a local reduction of hermeticity in the region of the welded joint 54. The second stage seal 40 can seal any such defects to improve the overall hermeticity of the seal element.

While FIGS. 1-8 illustrate portions of exemplary products including a two-stage seal element, it will be appreciated that other products can include the seal element (e.g., flat panel displays). As such, the invention described and claimed herein should not be construed to encompass only window assemblies.

It is understood that the invention may embody other specific forms, or incorporate combinations of the embodiments described herein, without departing from the spirit or characteristics the invention. While specific embodiments have been illustrated and described, other modifications may be made without significantly departing from the spirit of the invention.

Various features of the invention are set forth in the following claims.

The invention claimed is:

1. An evacuated glazing assembly having first and second spaced-apart substrates connected to each other by a seal element to form an evacuable interior space therebetween, wherein the seal element is formed by:
   bonding a metallic bridge element to at least one of the substrates using cold welding to form a first stage seal; and
   forming a second stage seal in contact with and disposed at least partially over the first stage seal, the second stage seal further positioned partially laterally inward of the first stage seal such that the second stage seal is partially bonded directly to the at least one of the substrates,
   wherein the second stage seal is configured to hermetically seal the first stage seal, and
   wherein the seal element is configured to hermetically isolate the interior space from the surrounding environment.

2. The evacuated glazing assembly of claim 1, wherein forming the second stage seal includes applying a sealing material partially in contact with the first stage seal.

3. The evacuated glazing assembly of claim 2, wherein the sealing material includes solderglass.

4. The evacuated glazing assembly of claim 2, wherein the sealing material includes metal solder.

5. The evacuated glazing assembly of claim 2, wherein the sealing material includes an organic sealing material.

6. The evacuated glazing assembly of claim 2, wherein forming the second stage seal further includes heating the evacuated glazing assembly.

7. The evacuated glazing assembly of claim 1, wherein forming the second stage seal includes welding at least a portion of the first stage seal.

8. The evacuated glazing assembly of claim 1, wherein cold welding includes contacting the metallic bridge element with a vibrating sonotrode.

9. The evacuated glazing assembly of claim 1, wherein the metallic bridge element includes a first segment bonded to the first substrate, and a second segment bonded to the second substrate.

10. The evacuated glazing assembly of claim 9, wherein the first segment is welded to the second segment.

11. The evacuated glazing assembly of claim 9, wherein the first segment is bonded to the second segment using a connecting material.

12. An evacuated glazing assembly comprising:
a first substrate;
a second substrate spaced from the first substrate to define an interior space therebetween;
a seal element disposed between the first substrate and the second substrate to hermetically isolate the interior space from a surrounding environment, wherein the seal element includes:
 a metallic bridge element at least partially located between the first substrate and the second substrate, the metallic bridge element having an elongated section extending along a peripheral side of the evacuated glazing,
 a first stage seal defined by a cold-welded bond between the metallic bridge element and the first substrate, the first stage seal having an inboard edge extending along the elongated section of the metallic bridge element and the first substrate, and
 a second stage seal in contact with the first stage seal along the inboard edge, and the second stage seal further at least partially covering the first stage seal.

13. The evacuated glazing assembly of claim 12, wherein the first stage seal includes a metallic or inorganic interlayer between the metallic bridge element and the first substrate.

14. The evacuated glazing assembly of claim 12, wherein the second stage seal includes a sealing material configured to be heated to form the second stage seal and applied at least partially in contact with the first stage seal.

15. The evacuated glazing assembly of claim 12, wherein the second stage seal includes a welded portion of the metallic bridge element different from the cold-welded bond.

16. The evacuated glazing assembly of claim 12, wherein the first stage seal defines a structural connection between the metallic bridge element and the first substrate having a shear strength greater than a tensile strength of the metallic bridge element.

17. The evacuated glazing assembly of claim 12, wherein both the first stage seal and the second stage seal contribute to the hermeticity of the seal element.

18. The evacuated glazing assembly of claim 12, wherein the second stage seal is configured to fill imperfections in the first stage seal.

19. The evacuated glazing assembly of claim 12, wherein the first substrate is made of a non-metallic material.

20. The evacuated glazing assembly of claim 19, wherein the second substrate is made of a non-metallic material.

21. A method of forming a seal element for hermetically isolate an interior space between a first substrate and a second substrate of an evacuated glazing assembly from a surrounding environment, the method comprising:
bonding a metallic bridge element to each of the first substrate and the second substrate via respective cold-welds to form corresponding first stage seals between the metallic bridge element, each of the first stage seals having an inboard edge extending along the metallic bridge element and the first and second substrates, respectively;
applying a sealing material at least partially in contact with and along the inboard edge of each of the first stage seals, the sealing material further disposed at least partially over each of the first stage seals; and
heating the sealing material to form a second stage seal.

22. The method of claim 21, wherein the sealing material includes at least one selected from a group consisting of: solderglass, metal, and organic sealing material.

* * * * *